United States Patent [19]

Hahn et al.

[11] 3,868,448
[45] Feb. 25, 1975

[54] METHOD FOR BLOAT CONTROL
[75] Inventors: Peter A. Hahn, Grosse Point Park, Mich.; Frank J. Hartdegen, Columbia; Marlin A. Espenshade, Ellicott City, both of Md.
[73] Assignee: W. R. Grace & Co., New York, N.Y.
[22] Filed: Dec. 7, 1973
[21] Appl. No.: 422,709

[52] U.S. Cl.................... 424/94, 195/65, 424/115
[51] Int. Cl.............................................. A61k 19/00
[58] Field of Search............................... 424/94, 115

[56] References Cited
UNITED STATES PATENTS
3,250,622   5/1966   Brooks................................ 424/94

OTHER PUBLICATIONS

Chem. Abst. Subject Index — 8th Collective Vol. 66–75 (1967–1971) page 29690S.

Primary Examiner—Sam Rosen
Attorney, Agent, or Firm—Charles L. Harness

[57] ABSTRACT

Administration of an enzyme obtained from the fermentation of a specific *Streptomyces griseus* is effective in preventing and/or curing bloat in ruminants.

8 Claims, No Drawings

METHOD FOR BLOAT CONTROL

This invention is directed to curing or preventing bloat, especially feedlot bloat, in ruminants by the administration of an enzyme obtained by fermentation of a Streptomyces isolated from soil. This microorganism is herein referred to as NRRL 5747. It has been placed on deposit at U.S. Department of Agriculture, Northern Regional Research Laboratory, 1815 North University Street, Peoria, Ill. 61604, and is available from that depository under the conditions stated in Notice, 886 O.G. 638.

TAXONOMY OF NRRL 5747

This particular species of Streptomyces griseus forms loosely filamentous colonies with an abundance of long, branching aerial hyphae that segment into spiral chains of bead-like spores. Whole-cell hydrolysates of this strain contain the LL-form of diaminopimelic acid.

The physiological properties of NRRL 5747 are listed in the table below, in comparison with 123 strains of other varieties of Streptomyces griseus.

Table 1

| Property | % of 123 known strains of S. griseus having the property | Response of NRRL 5747 |
| --- | --- | --- |
| Decomposition of | | |
| Adenine | 98 | + |
| Casein | 100 | + |
| Hypoxanthine | 100 | + |
| Tyrosine | 100 | + |
| Urea | 97 | + |
| Xanthine | 100 | + |
| Growth at | | |
| 50° | 0 | − |
| 45° | 0 | + |
| 40° | 33 | + |
| 10° | 100 | + |
| Survival at 50° for 8 hr | 99 | + |
| Nitrite from nitrate | 73 | − |
| Utilization of | | |
| Citrate | 99 | + |
| Lactate | 90 | + |
| Malate | 100 | + |
| Mucate | 0 | − |
| Oxalate | 0 | − |
| Succinate | 100 | + |
| Resistance to | | |
| Lysozyme | 1 | − |
| Salicylate | 2 | − |
| Oxidation of glucose | 98 | + |
| Fermentation of glucose | 0 | − |
| Hydrolysis of | | |
| Hippurate | 5 | − |
| Starch | 100 | + |
| Acid from | | |
| Adonitol | 43 | − |
| Arabinose | 63 | + |
| Dulcitol | 0 | − |
| Erythritol | 1 | − |
| Galactose | 99 | + |
| Glucose | 100 | + |
| Inositol | 15 | + |
| Lactose | 100 | + |
| Maltose | 100 | + |
| Mannitol | 97 | + |
| Mannose | 100 | + |
| Melibiose | 0 | + |
| α-Methyl-D-glucoside | 98 | + |
| Raffinose | 2 | − |
| Rhamnose | 31 | − |
| Sorbitol | 0 | − |
| Trehalose | 99 | + |
| Xylose | 100 | + |

The enzyme used in this invention is obtained by fermentation of the aforesaid NRRL 5747. The enzyme is isolated from the culture in crude or in purified form and then is administered to the ruminant in a controlled dosage. A suitable dosage is 200 to 4000 or more units per animal. A preferred dosage is 1000 to 2000 units per animal. The dosage can be repeated periodically (for example at 30 minute intervals) until the bloat is relieved. In most cases one dose is sufficient. A unit of enzyme obtained by the process of this invention is stated herein as a value obtained by the effect of the enzyme on gastric mucin. More precisely stated, a unit of enzyme is selected as that amount of enzyme (whether crude or pure) which, when added to 1 ml. of water, and that solution added to 1 ml. of Prepared Solution of Gastric Mucin (as hereinafter defined), reduces the viscosity of the said Prepared Solution of Gastric Mucin by 50% in 2 hours at 39° C.

The invention is directed to the process of fermenting the stated species of Streptomyces; to the enzyme so prepared; and to the process of preventing or relieving bloat in ruminants by the use of the said enzyme.

Bloat can occur from pasture feeding as well as in the feedlot. In pasture feeding bloat may be typically encountered when the ruminant is fed on lush legume pastures. The chain of causation is not clearly understood, but it is speculated that lush legumes contain considerable amount of pectins, plant proteins, and saponins, some or all of which contribute to a stable foam.

Feedlot bloat can occur anywhere; it is independent of geography or locale.

There appear to be some types of bloat that are brought about by high activity of a gas-forming bacteria. Treatment with antibiotics may bring this type of foam under control, by striking directly at the foam-producing bacteria. In such cases the antibiotic can be added directly to the feed or can be administered intramuscularly. Penicillin is an example. This type of treatment works better with mild bloat. It does not appear to control cases of moderate or severe bloat. The use of our enzyme material will control bloat whether mild, moderate or severe.

Feedlot bloat apparently may occur from abrupt changes in diet to starchy concentrate feeds. Also, some feeds, e.g., barley, seem to promote bloat.

The instant invention is particularly useful in control of feedlot bloat.

The instant invention involves administration of an enzyme-containing product to the ruminant. This enzyme is able to break down the rumen foam, thereby destroying the foam and permitting release of gas by normal eructation reflex.

Our enzyme is so effective that the problem of maintaining a predetermined concentration of several hours time is completely avoided. In other words the enzyme in most cases works immediately. In the more obstinate cases, a second treatment may be required. When our enzyme brings the foam under control, either by the first treatment or by a second treatment, the cure appears to be substantially permanent, and the bloat does not reappear.

CAUSE OF BLOAT

The ultimate causes of bloat in a ruminant have yet to be firmly established. The condition itself consists of development of foam within the rumen or paunch of the animal. The gas phase of this foam may be largely carbon dioxide admixed with other fermentation gases, e.g., methane. The liquid continuous phase of the foam is itself generally an aqueous solution or suspension of very complex organic material, typically proteins, pectins, etc. But for the presence of the liquid phase of the foam, the animal would be able to void the gas by simple eructation reflex; however, when foam covers the cardia area (entry of the esophagus into the rumen), the eructation reflex is inhibited. Hence the pressure continues to build up, and if the animal does not obtain relief it will die. In a severe case of bloat gas pressure may be as high as 70 mm. of Hg. This pressure results in an increased absorption of carbon dioxide into the blood and restricts the return of the venous blood through the vena cava vein back to the heart. Under these conditions, if sufficiently long continued, death occurs by suffocation.

The reason that the eructation reflex is inhibited when the cardia is covered with foam is that if the animal were to eructate under such conditions, some of the liquid in the foam would pass into the lungs. This, of course, would be very dangerous.

If the foam can be brought under control, so that it recedes from the cardia area, the normal eructation reflex will then be activated, and the excess gas pressure can be relieved by normal eructation. A number of legume bloat control measures do in fact involve foam control. It has been found for example that treatment of the animal with an anti-foaming agent may relieve legume bloat but not feedlot bloat.

Some of the anti-foaming agents may act in a more complex manner. The alkyl aryl sulfonates apparently act as inhibitors for pectin methyl esterase. The function and efficacy of some of the other agents is not so clear. Other materials reported for foam control include vegetable oils, lecithin, animal fats, whale oil, mineral oils, liquid paraffins, paraffin-wax emulsions, detergents, turpentine, diethyl ether, silicones, glycerol, plant and animal mucins, and the like. However, materials that operate in legume bloat apparently do not work effectively for feedlot bloat, and some treatments may actually be detrimental. For example 8% soy bean oil (which works to relieve legume bloat) actually increased bloating in a case of attempted treatment of feedlot bloat. Although preventives for feedlot bloat have been proposed (certain quaternary ammonium compounds—cf. U.S. Pat. No. 3,686,416) prior to the instant invention there was no known effective cure for feedlot bloat. While we do not wish to be bound to any specific mechanism, we believe that our treatment works because our enzyme in effect destroys the mucin that forms the continuous liquid phase of the bloat-foam. This is an unobvious approach with an unexpected consequence.

Michel Hooreman, in U.S. Pat. No. 3,683,069 describes the effect of certain enzymes (e.g., from *Streptomyces fradiae*) on the reduction of viscosity of bronchial, intestinal, and cervical mucus for the purpose of improving nutrition, etc. He concludes that the enzyme should be chosen so as to give an effect intermediate between the effect given by trypsin and chymotrypsin. He reports work done with a more active enzyme obtained from *Bacillus subtilis* and shows that the use of that enzyme was deleterious. (It retarded growth in rats.) On the other hand the enzyme of the instant invention is more active toward mucus than those described by Hooreman, being even more active than that Hooreman obtained from *Bacillus subtilis*. Yet, not only has the use of our enzyme not retarded growth in ruminants, it has been remarkably effective in a beneficial way, i.e., in curing feedlot bloat. Our NRRL 5747, being a *Streptomyces griseus*, is of course a different microorganism from *Streptomyces fradiae*.

The following examples illustrate without limiting the invention.

EXAMPLE 1

Culture Used to Produce the Enzyme

NRRL 5747, used for the production of the enzyme, is a Streptomycete soil isolate. The organism grows well on potato dextrose agar (PDA) and on Czapek Dox Agar (CDA). The organism is preserved in lyophilized ampuls.

Fermentation Production Process

A. Inoculum Stage

The spores from a 2-week old agar slant (CDA) are suspended in 10 ml. of sterilized deionized water, which is used to inoculate 1 liter of broth in a 4-liter aspirator bottle. The medium is composed of normal fermentation constituents, as follows:

Table 2

|  | % |
|---|---|
| 87% Concentrate Feed[1/] | 5.0 |
| Cottonseed meal | 0.3 |
| Corn oil meal | 0.1 |
| Soybean Oil Meal (Solvent Extracted) 44% Protein | 0.1 |
| $K_2HPO_4$ | 0.1 |
| $MgSO_4.7H_2O$ | 0.1 |
| $FeSO_4.7H_2O$ | 0.0001 |
| $CaCO_3$ | 1.0 |
| NaCl | 0.05 |

Deionized Water, balance to make 100%
pH adjusted to 7.0 before sterilization
Antifoaming agent (silicone oil) 1 drop/100 ml.
30 minutes sterilization at 121°C (250°F.), 15 psi

1/

| 87% Concentrate Feed | % of total medium |
|---|---|
| 1) Ground Corn Cobs | 0.3875 |
| 2) Dehydrated Alfalfa meal (17%) | 0.265 |
| 3) Ground Corn | 3.42 |
| 4) Dried Beet Pulp | 0.53 |
| 5) Cane Molasses on Soybean Millfeed (42% invert-CHO) | 0.1325 |
| 6) Protein Supplement[a/] | 0.265 |
|  | 5.0000 | a/

| Protein Supplement | | |
|---|---|---|
| a) Soybean Meal (49–50% Protein) | 30 | lbs. |
| b) Dehydrated Alfalfa Meal (20% Protein) | 22.5 | do. |
| c) Meat Meal (55% Protein) | 15 | do. |
| d) Urea | 9.5 | do. |
| e) Dicalcium phosphate | 5 | do. |
| f) Ground Limestone | 3.25 | do. |
| g) Salt with Trace Minerals | 12.5 | do. |
| h) Vitamin ADE premix[i/] | .65 | do. |
|  | 100 | lbs. | i/

Vitamin Premix
4,500,000 units Vitamin A per lb. premix
1,000,000 units Vitamin D do. do. do.
500 units Vitamin E do. do. do The inoculum bottle is incubated on a rotary shaker (250 RPM) at 25°C for 3 days, and then checked for sterility before being "crossed" or transferred to production fermentor.

B. Production Stage

The production unit is a conventional 14-liter fermentor which contains 10 liters of broth and 1 liter of inoculum (both previously described in A above).

The operating conditions for the fermentation process are as follows:
10 liters of broth (see A above for constituents)
1 liter of inoculum
400 RPM
2.5 liters sterile air/minute passed through fermentor
Fermentation temperature, 25°C
Harvest when peak enzyme titre has been attained in about 7 days.

Isolation of the Enzyme

The enzyme is recovered by utilizing the fact that it is insoluble in slightly acidic acetone. Thus, the following steps are undertaken. First, the fermentation broth is centrifuged to remove all insoluble material including cells. The pH of the supernatant solution is then adjusted to 5.5 by the addition of glacial acetic acid. The enzyme is precipitated by adding 3 liters of acetone per one liter of solution. Optimum yield is obtained by using cold acetone and cooling the suspension to −20° for 18 hours. The acetone insoluble enzyme is separated by centrifugation. The resultant enzyme is then washed with dry acetone to remove residual water. The enzyme can also be obtained by any standard biochemical techniques, such as ammonium sulfate precipitation, ion exchange or gel filtration chromatography, lyophylization, etc. Finally the enzyme is dried in vacuo at 25°C. to remove acetone. This final product can be placed in a standard gelatin bolus for use. It is stable at room temperature. One gram of product so prepared generally represents about 500 units.

The Bloat-Enzyme Assay

A. Substrate

Prepare a 7.5% (w/w) solution of gastric mucin, bacteriological in 0.2 M phosphate buffer, pH 7.0, by heating the suspension to around 50° C. until it dissolves, then cooling to 25° C.

B. Enzyme

The test enzyme solution can be either centrifuged fermentation broth (per Example 1) used directly, or a solution of the dry isolated enzyme; 2 to 3 mg/ml is a good level if a single level assay is being done.

C. Hydrolysis

Pipette 1.0 ml. of substrate into each of two 25 ml. Erlenmeyer flasks. Pipette 1.0 ml. test solution into one of the flasks (test) and 1.0 ml. water into the other (control). Place flasks into a 39° C. water bath and shake for 2 hours.

D. Assay

Draw the sample into a 1.0 ml. constricted tip graduated pipette to the 0 mark. Release vacuum and measure the time in seconds required for the solution to drain to the 0.8 ml. mark. Do for both test, control and also for water (blank). NOTE: If drain time for control is less than 13 sec., prepare fresh substrate and repeat assay. This method gives accurate and reproducible results; however, any standard method of measuring viscosity, e.g., Ostwald viscositimeter with a constant temperature bath, is suitable.

E. Calculation of Enzyme Units

First, calculate the percent decrease in viscosity of mucin caused by the enzyme:

%Viscosity Decrease = (Time of Control)−(Time of Sample)/(Time of Control)−(Time of Blank) × 100

Second, calculate the enzyme units in test sample.

One unit of activity is defined as the amount of enzyme which when added to 1.0 ml water gives an assay of 50% using the above test. The enzyme units are most accurately determined by varying the enzyme concentration in the test solution until a 50% assay result is obtained. However, in any assay where the percent decrease as determined above is between 10% and 90%, the units can be calculated as given below.

The viscosity of a mucin solution is not a linear function of the mucin concentration; therefore, the percent viscosity decrease of a mucin solution is not a linear function of the amount of enzyme present. Therefore, the enzyme units must be determined from the quadratic equation of the hyperbolic function relating degree of hydrolysis to viscosity change. To simplify calculations, the units as a function of percent viscosity decrease are given in Table 1 below.

Results are expressed in units/ml for spun fermentation broths or units/mg for solutions prepared from dry enzyme.

Table 3

| % Viscosity Decrease | Enzyme Units/ml | % Viscosity Decrease | Enzyme Units/ml |
|---|---|---|---|
| 90 | 9 | 60 | 1.6 |
| 88 | 7 | 58 | 1.5 |
| 86 | 6 | 56 | 1.4 |
| 84 | 5.4 | 54 | 1.2 |
| 82 | 4.8 | 52 | 1.1 |
| 80 | 4.3 | 50 | 1.0 |
| 78 | 4.0 | 48 | 0.9 |
| 76 | 3.6 | 46 | 0.8 |
| 74 | 3.2 | 44 | 0.7 |
| 72 | 3.0 | 42 | 0.6 |
| 70 | 2.7 | 40 | 0.5 |
| 68 | 2.4 | 35 | 0.4 |
| 66 | 2.2 | 30 | 0.3 |
| 64 | 2.0 | 20 | 0.2 |
| 62 | 1.8 | 10 | 0.1 |

Enzyme Characteristics

A. Yield

Typical fermentations give 2 to 6 gm. dry isolated enzyme per liter of centrifuged broth. The activity range is between 0.3 and 1.0 units/mg.

B. In vitro Testing

The above assay procedure uses bacteriological mucin as a substrate since its low cost makes it suitable for routine work. For an in vitro test, the enzyme activity was measured using as substrate a solution of bovine submaxillary mucin. With this substrate, the percent viscosity decrease was four times that achieved using bacteriological mucin on a per mg basis.

C. Stability

The degree of enzyme denaturation in the dry form was determined as a function of time and temperature (i.e., storage stability). Storage at 43° (109°F) for 28 weeks or at 50° C. (122°F) for 8 weeks resulted in less than a 10% activity decrease.

Administration of Enzyme

There are several ways of administering the enzyme to the ruminant:

(a) A convenient means is by bolus. A bolus is prepared by compressing 200–2000 units of dry enzyme with sufficient dry compatible carrier, e.g., lactose, to make a bolus pellet about ¾ inches in diameter by 3 inches long. This bolus can then be forced down the ruminant's throat by a conventional bolus gun. The idea, of course, is to get the bolus past the tongue. After this the animal will swallow the medication by reflex.

(b) Another means is to fill a gelatin capsule with the requisite amount of enzyme, plus a dry compatible filler, e.g., lactose, and then the capsule is likewise forced down the animal's throat by a bolus gun. Capsule dimensions may be typically ¾ inch diameter by 3 inches long.

(c) Another means is to inject the requisite dosage by hypodermic syringe direct into the rumen. The material injected is a liquid, comprising 200–2000 units of enzyme in a compatible liquid carrier, e.g., mineral oil. In a typical case, 4 grams of dry enzyme (2000 units) were suspended in 16 ml. of mineral oil and used in a 14-gauge hypodermic syringe.

(d) The dried enzyme can also be pelletized either alone or as part of a pre-mix and added as a supplement to the feed. The dried enzyme as a powder can be added directly to the feed.

(e) The broth (i.e., the final fermentation liquor containing the enzyme, and the broth being either whole or the liquid resulting from centrifugation or filtration) can be added directly to the feed. In this fashion neither drying nor extraction is required. While this means can be used as a medication, it is not one of the preferred modes of administration because of the animal's reluctance to eat while it is bloated. This mode, however, is recommended as the simplest for prophylactic purposes. Sufficient enzyme product is added direct to the daily feed of the ruminant to provide the recommended 200–2000 units of enzyme.

EXAMPLE 1

Treatment of Two Steers

Four-gram gelatin capsules of bloat-enzyme were effective in treating feedlot bloat in these two instances. The two steers in question had developed feedlot bloat as a result of maladjustment to a high level starch concentrate feed (87% sorghum and 13% roughage). The customary symptoms of bloat were present in both steers, namely, a severely distended rumen, and they were both off feed. One of the steers was given a single capsule of the bloat enzyme product (2000 units), and responded to this treatment within 15 minutes. In this steer the condition was considered cured, since the animal resumed normal feeding and all symptoms of bloat disappeared.

The second bloated steer was first "let down" with a hose, but this animal immediately bloated again. One capsule was administered first. Apparently this was not sufficient since it had no apparent effect after 15 minutes time. A second capsule was then administered. The bloated condition was completely relieved within ten minutes of the second administration.

There was no recurrence of bloat for either of these two steers.

EXAMPLE 2

Experiment With A Single Steer

This animal, while not a chronic bloater, had previously bloated, and on that occasion had been treated with a laxative, poloxalene, and letting the air out with a hose. However, the animal bloated again, and on the second occasion was treated with a two-gram gelatin capsule of our bloat enzyme (2000 units). This relieved the bloat immediately. He was observed for 3 days thereafter, and during this time had no further recurrence of bloat.

In the aforesaid examples only the weight of the enzyme in the capsule is stated. Lactose was added in each instance to take up any remaining air space in the capsule.

What is claimed is:

1. The method of controlling bloat in a ruminant that comprises administering to the ruminant an effective amount of the enzyme obtained by culturing *Streptomyces griseus* NRRL 5747 in a fermentation medium until said enzyme has the following characteristics:
   a. 1 g. of enzyme represents about 500 units, 1 unit being that amount of enzyme which when dissolved in 1 ml. of water reduces the viscosity of 1 ml. of prepared gastric mucin by 50% in 2 hours at 39° C.;
   b. said enzyme is insoluble in acidic acetone;
   c. centrifuged broth from the fermentation medium contains 0.3–1.0 units of enzyme/mg. broth;
   d. storage of the dry enzyme at 109° F. for 28 weeks or at 122° F. for 8 weeks results in less than 10% activity decrease.

2. The method of claim 1 in which the enzyme is administered to the animal as a prophylactic while the animal is in an unbloated condition.

3. The method according to claim 1 in which the enzyme is administered while the animal is in a bloated condition.

4. The method according to claim 3 in which the enzyme is administered to steers suffering from feedlot bloat, in a dosage of 1000–2000 units per animal.

5. The method according to claim 4 in which the enzyme product is administered in the form of a bolus.

6. The method according to claim 4 in which the enzyme product is administered by intrarumenal injection.

7. The method according to claim 4 in which the enzyme product is administered in the form of a gelatin capsule.

8. The method according to claim 2 in which the enzyme product is administered by adding the enzyme to the feed to be fed the ruminant.

* * * * *